United States Patent [19]

Horio et al.

[11] Patent Number: 4,571,629
[45] Date of Patent: Feb. 18, 1986

[54] ROTARY SHUTTER DEVICE

[75] Inventors: Motohiko Horio; Naoki Kobayashi; Kouji Kaneko, all of Saitama, Japan

[73] Assignee: Fuji Photo Optical Co., Ltd., Saitama, Japan

[21] Appl. No.: 739,008

[22] Filed: May 29, 1985

[30] Foreign Application Priority Data

Jul. 12, 1984 [JP] Japan ................... 59-144894
Jul. 20, 1984 [JP] Japan ................ 59-109873[U]

[51] Int. Cl.⁴ .............................................. H04N 5/30
[52] U.S. Cl. ..................................... 358/225; 358/209
[58] Field of Search ................. 358/209, 225, 226, 55, 358/909, 213; 352/216

[56] References Cited

U.S. PATENT DOCUMENTS

| | | | |
|---|---|---|---|
| 3,303,271 | 2/1967 | Hecker | 358/225 |
| 4,171,529 | 10/1979 | Silberberg et al. | 358/209 |
| 4,301,476 | 11/1981 | Keller et al. | 358/209 |
| 4,504,866 | 3/1985 | Saito | 358/213 |
| 4,551,763 | 11/1985 | Swinehart | 358/225 |

FOREIGN PATENT DOCUMENTS

149423 11/1979 Japan ..................... 358/225

Primary Examiner—Gene Z. Rubinson
Assistant Examiner—Robert G. Lev

[57] ABSTRACT

A rotary shutter device for use in an electronic still camera or a VTR camera has an XY-addressable solid-state imaging device for converting an optical image read by successive horizontal scanning into a video signal, a shutter blade disposed in front of the solid-state imaging device and rotatable about its own axis, the shutter blade having at least one opening for transmitting light therethrough onto the photodetector surface of the solid-state imaging device, and an adjusting blade disposed adjacent to the shutter blade for varying the opening angle of the opening. The shutter and adjusting blades are rotatable together in a direction to successively expose the solid-state imaging device to incident light in the direction in which the solid-state imaging device is vertically scanned. The scanning of the solid-state imaging device for one field is completed between two successive exposures thereof through the opening in the shutter blade.

4 Claims, 9 Drawing Figures

ROTARY SHUTTER DEVICE

BACKGROUND OF THE INVENTION

1. Field of the Invention

The present invention relates to a rotary shutter device for use in an electronic still camera or a VTR camera in which the optical image of an object focused on an XY-addressable solid-state imaging device such as a MOS image sensor or a CCD image sensor is photoelectrically converted into a video signal that is delivered to a recorder or other device, and more particularly to a rotary shutter device having adjusting blades for adjusting the angular widths or intervals of the openings in a shutter blade through which the imaging device can be exposed to incident light, thereby adjusting the shutter speed.

2. Description of the Prior Art

There are known electronic photographic cameras, particularly of a portable type, with a solid-state imaging device such as a MOS image sensor or a CCD image sensor. The know electronic photographic cameras have a rotary shutter disposed between the objective lens and the image sensor for achieving higher and more uniform shutter speeds.

The rotary shutter is composed of a shutter disc or blade having openings defined therein and mounted on the rotating shaft of a step motor or the like. When the step motor is energized, the shutter disc is rotated to uncover and cover the openings for transmitting and shutting off light falling on the imaging device. The rotary shutter can operate at high and uniform speeds and is highly durable in operation.

In view of the above advantages of the rotary shutter, it has been proposed to employ the rotary shutter as the shutter in a camera for recording successive images, such as a VTR camera. The solid-state imaging device is exposed to each object image through the openings of the rotary shutter in either 1/60 second (sequential scanning) or 1/30 second (interlaced scanning), depending on the TV broadcasting system in use. The shutter blade therefore rotates at a constant speed. This system is however disadvantageous in that a desired exposure time cannot be selected by changing the speed of rotation of the shutter disc. For changing the exposure time as desired in the camera for recording successive images, it is preferable to vary the angular intervals of the openings of the rotary shutter. One example of such a rotary shutter is composed of two superimposed shutter blades having sectorial shapes and movable relatively to each other for adjusting the opening angle therebetween. The camera with this rotary shutter has a shutter speed selecting mechanism for allowing the user to select the exposure time or shutter speed.

Since the solid-state imaging device is scanned while being shielded from light, the rotary shutter is required to have light-shielding portions aside from the openings. For setting the shutter speed to 1/60 second, because the time required for scanning the imaging device for one field is normally 1/60 second, the opening angles of the openings should be selected so as to make the openings larger than the photodetector surface of the imaging device, and the rotary shutter should be stopped against rotation to bring one of the openings in alignment with the imaging device.

If the rotary shutter were to be stopped by depressing a rotary shutter stop button, the user would be required both to operate the shutter speed selecting mechanism for a desired shutter speed setting and to depress the rotary shutter stop button. The required operation would be so complex and time-consuming that the user would tend to miss good chances for taking pictures.

There is a recent demand for a function that makes it possible to select one of the recorded moving images and produce it as a still image. To meet this demand, many VTR systems commercially available today include a mechanism for producing still images.

Where the image of an object, particularly a moving object, is produced as a still image by the successive-image recording camera with the rotary shutter, and the still image is produced by an exposure through more than one opening in the shutter blades, the resulting image is blurred as it suffers irregularities between adjacent horizontal scanning lines.

SUMMARY OF THE INVENTION

In view of the foregoing shortcomings of the conventional rotary shutter device, it is an object of the present invention to provide a rotary shutter device for use in an electronic still camera, a VTR camera, or the like which has a solid-state imaging device, the rotary shutter device being arranged to allow high-quality still images as well as high-quality successive images to be produced.

Another object of the present invention is to provide a rotary shutter device which can easily be operated by the user for selecting a desired shutter speed.

According to the present invention, a rotary shutter device includes first and second shutter members composed of first and second shutter blades jointly defining at least one opening for transmitting light emitted from an object so as to fall on the photodetector surface of a solid-state imaging device. The opening is shaped and positioned such that the solid-state imaging device is successively exposed to the light so as to be vertically scanned. The scanning of the solid-state imaging device for one field is completed between two successive exposures thereof through the opening or during one light-shielding period.

More specifically, when the shutter blades are rotated, the opening are also rotated to move the light transmitted therethrough across the solid-state imaging device in the vertical scanning direction. When the solid-state imaging device starts being shielded from the light as the shutter blades are continuously rotated, it simultaneously starts to be scanned horizontally where it is shielded to read image information stored therein. Continued rotation of the shutter blades resumes exposure of the imaging device where it has been horizontally scanned. The second shutter member is angularly movable with respect to the first shutter member to vary the opening angle of the opening for thereby changing the exposure time or shutter speed.

Since the solid-state imaging device of the rotary shutter device according to the invention is scanned during two successive exposures thereof, no image irregularities or discontinuities occur between adjacent horizontal scanning lines even when a fast-moving object is photographed to obtain a still image. Depending on the amount of incident light falling on the solid-state imaging device and the speed of movement of the object, the opening angle of the opening can be changed as desired to vary the shutter speed. Therefore, successive images or still images can be produced with proper exposure settings.

The rotary shutter device also includes a shutter speed selecting means for selecting an opening angle for the opening, an adjusting means for adjusting the opening angle of the opening in response to operation of the shutter speed selecting means, a control means for opening a driving circuit for the rotating means when the shutter speed selecting means is operated from a reference position beyond a predetermined interval, and a means for increasing the opening angle of the opening to an extent greater than the size of the solid-stae imaging device and bringing the opening into alignment with the solid-state imaging device.

When the user turns the shutter speed selecting means to select a shutter speed such as 1/125 second, for example, shorter than the predetermined interval, the adjusting means adjusts the opening angle to a corresponding extent in response to the turning movement of the shutter speed selecting means. At the same time, the control means closes the driving circuit for the rotating means to rotate the rotary shutter coupled to the rotating means. When the shutter speed selecting means is turned to select a shutter speed longer than the predetermined interval, 1/60 second for example, the control means opens the driving circuit to stop the rotation of the rotary shutter.

Therefore, at the time the user selects a shutter speed which requires the rotary shutter to be stopped, the rotary shutter is automatically stopped by actuating the shutter speed selecting means to select the desired shutter speed. The rotary shutter device of the invention is not required to include any operator-controlled means for stopping the rotation of the rotary shutter. The rotary shutter device can easily be operated by the user without danger of his losing a good chance to take pictures.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Identical parts are denoted by identical reference characters throughout several views.

Figure 1:
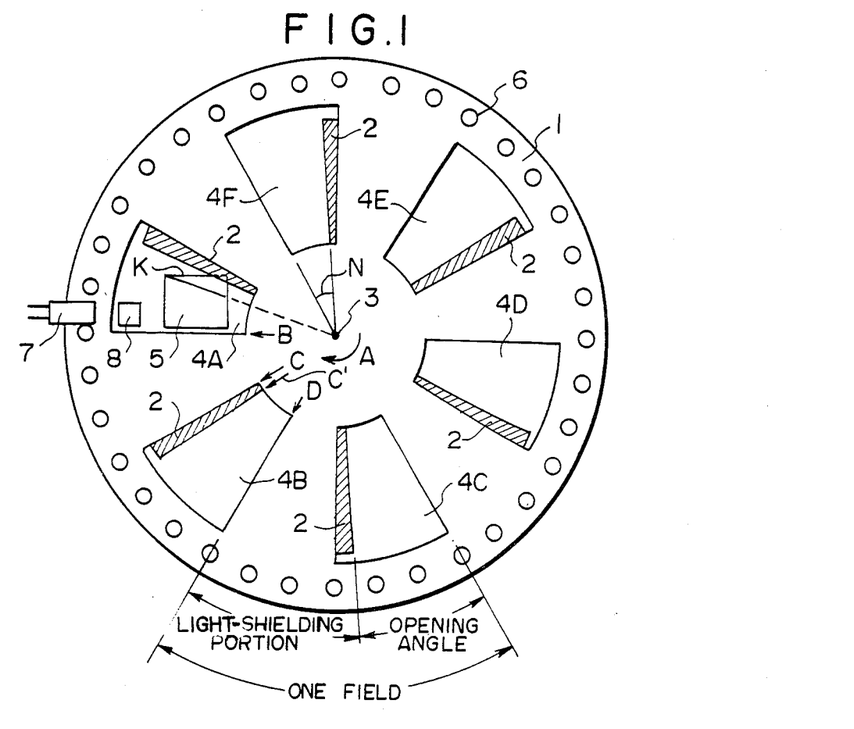
FIG. 1 is a plan view of a rotary shutter device according to a first embodiment of the present invention.
Figure 2:
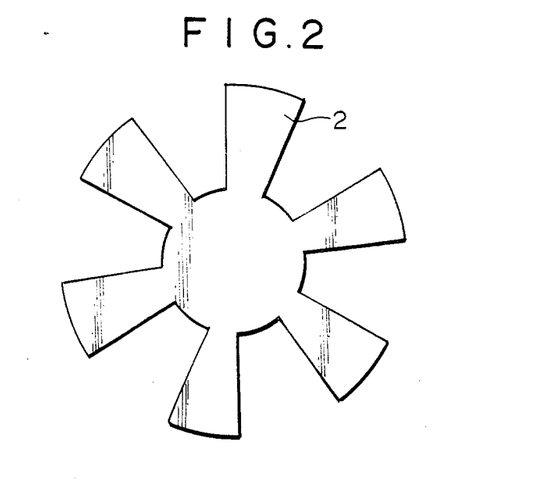
FIG. 2 is a plan view of an adjusting blade of the rotary shutter device shown in FIG. 1.

As shown in FIG. 1, a rotary shutter device comprises a circular shutter blade 1 and an adjusting blade 2 which are superimposed on each other and rotatable in the direction of the arrow A about an axis 3. The shutter blade 1 has six sectorial openings 4A through 4F defined therein and spaced at equal angular intervals for transmitting and shutting off incident light emitted from an object through an optical system and falling on the shutter blade 1. The adjusting blade 2 is disposed behind the shutter blade 1 and is slidably rotatable with respect thereto. As shown in FIG. 2, the adjusting blade 2 has six sectorial projections or vanes projecting radially outwardly and spaced at the same equal angular intervals as those of the openings 4A through 4F in the shutter blade 1. The adjusting blade 2 rotates with respect to the shutter blade 1 for varying the angular width or interval N of each of the openings 4A through 4F. An XY-addressable MOS image sensor 5 of a substantially rectangular configuration is positioned behind the blades 1, 2 for converting the optical image of an object formed on the photosensitive surface thereof by the incident light having passed through one of the openings 4A through 4F, into an electric signal which is issued to a recorder or an image reproducer. The shutter blade 1 has a plurality of holes 6 (or markings of good reflectivity) arranged at equal angular spacings along the outer peripheral edge thereof. Light having passed through the holes 6 (or reflected by the markings) is detected by a speed-detecting photosensor (FG sensor) 7 disposed adjacent to the outer peripheral edge of the shutter blade 1 for controlling the speed of rotation of the shutter blade 1. A phase-detecting photosensor (PG sensor) 8 is located adjacent to the lower edge of the image sensor 5 for detecting a light-shielding portion of the blades 1, 2 for controlling the phase of rotation of the shutter blade 1.

The relationship between the rotation of the shutter blade 1 and the horizontal scanning of the image sensor 5 is described below.

Figure 3:
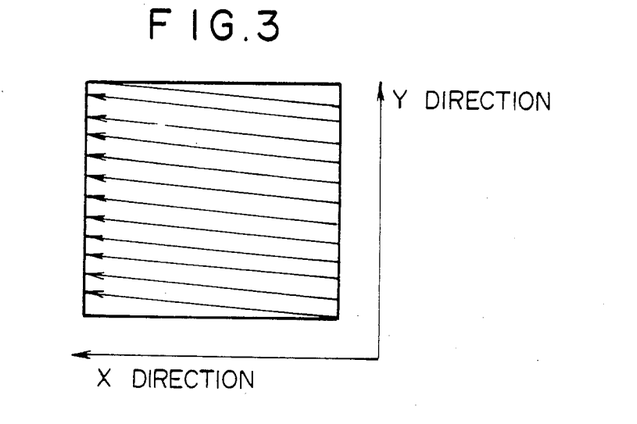
FIG. 3 is a diagram showing the manner in which a MOS image sensor is scanned.

When the shutter blade 1 rotates in the direction of the arrow A, the image sensor 5 is exposed by incident light transmitted through one of the openings, say the opening 4A. Thereafter, the image sensor 5 is shielded from the incident light progressively from its lower end toward its upper end upon continued rotation of the shutter blade 1. The image sensor 5 then starts being scanned sequentially upwardly from the lowermost scanning line in timed relation to the shielding of the image sensor 5 from the lower end thereof. The image sensor 5 is of the XY-addressable system which is scanned along sequential scanning lines from the bottom to the top thereof, as shown in FIG. 3.

The speed of rotation of the shutter blade 1 is selected such that the time required for scanning the entire surface of the image sensor 5 is 1/60 second, and that the time spent after the trailing edge B of the opening 4A starts to shield the image sensor 5 until the leading edge C of the following opening 4B finishes the shielding of the image sensor 5 is 1/60 second. At the time the scanning of the image sensor 5 along the uppermost scanning line is finished, the trailing end C' of one of the projections of the adjusting blade 2 which extends into the opening 4B is positioned on a straight line K. Where the angular intervals of the openings 4A through 4F are reduced by the adjusting blade 2 for a higher shutter speed, the image sensor 5 remains partially shielded by the adjusting blade 2 even upon completion of the scanning along the uppermost scanning line.

At the same time that the image sensor 5 is completely scanned for producing one field of signals, the image sensor 5 starts to be shielded again by the trailing edge D of the opening 4B, and the image information stored in the image sensor 5 by the exposure through the opening 4B starts to be read. The above cycle of operation is repeated as the shutter blade 1 is continuously rotated.

The shutter blade 1 makes one revolution in 1/10 second. During one revolution of the shutter blade 1, six frames of image signals are read by the image sensor 5 and delivered successively to a recorder or an image reproducer.

Figure 4:
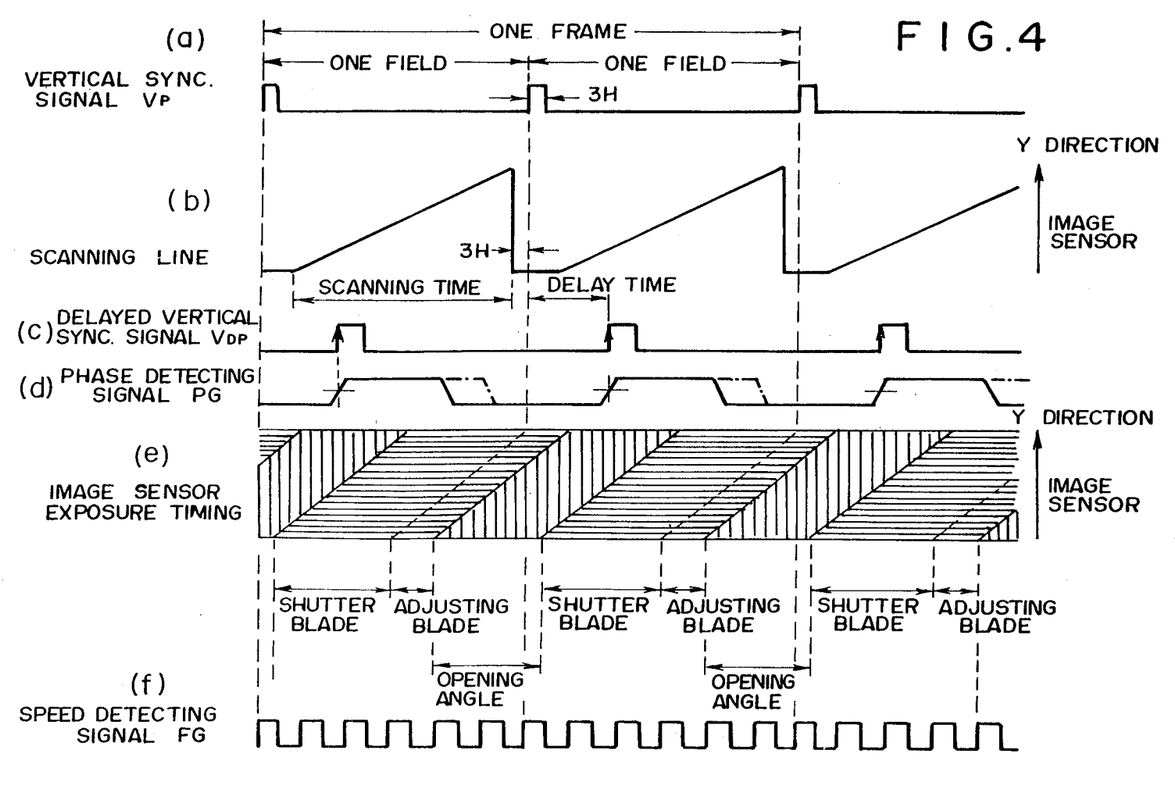
FIG. 4 is a timing chart of the operation of the rotary shutter device of FIG. 1 and of various signals produced for the operation thereof.

FIG. 4 is a timing chart of the foregoing operation. FIG. 4(a) shows a vertical synchronizing signal $V_P$ composed of rectangular pulses each having a duration equal to three horizontal scanning periods (3H). The period of each field starts with the positive-going edge of one of the these pulses. FIG. 4(b) illustrates the manner in which the scanning operation starts 6H after the beginning of each field and ends 3H before the ending of each field. FIG. 4(c) shows a delayed vertical synchronizing signal $V_{DP}$ composed of rectangular pulses each generated a prescribed delay time after the beginning of one of the fields. FIG. 4(d) shows a phase detecting signal PG produced when the PG sensor 8 detects a light-shielding portion of the shutter blade 1 and the adjusting blade 2. The shutter blade 1 is controlled to rotate such that the positive-going transition of the delayed vertical synchronizing signal $V_{DP}$ and the positive-going transition of the phase detecting signal PG are in synchronizm with each other. FIG. 4(e) illustrates shielding periods (hatched by horizontal lines) in which the image sensor 5 is shielded by the shutter blade 1 and the adjusting blade 2 and exposure periods in which the image sensor 5 is exposed to the incident light through the shutter blade 1 and the adjusting blade 2. FIG. 4(f) shows a speed detecting signal FG generated by the FG sensor 7 which detects the light transmitted through the holes 6 (or reflected by the markings).

Figure 5:
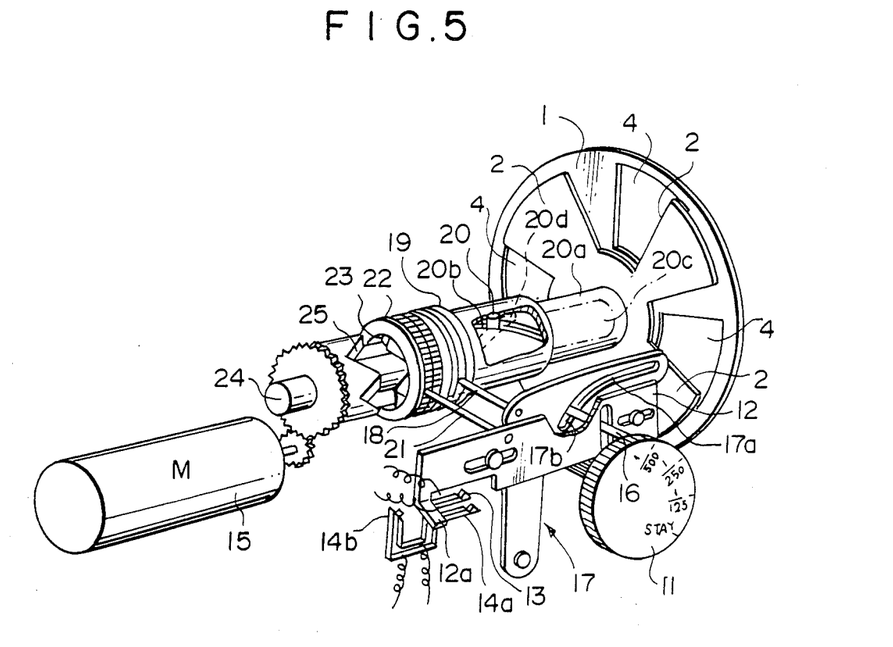
FIG. 5 is a perspective view of a shutter rotating mechanism of the rotary shutter device of FIG. 1.

FIG. 5 illustrates a shutter rotating mechanism coupled to and disposed behind a rotary shutter comprising the shutter blade 1 and the adjusting blade 2 for varying the shutter speed as desired. The rotary shutter can be set to a desired shutter speed by the user who turns a shutter speed dial 11 to select the corresponding shutter speed indicia thereon. When the dial 11 is turned to select any shutter speed indicia between the shutter speeds 1/125 second and 1/500 second (the shutter speed is continuously variable between these shutter speeds), an end 12a of a slide lever 12 closes switches SW13, SW14a. With the switch SW13 closed, the power supply circuit for a driving motor 15 for the rotary shutter is completed by a control circuit (not shown). By depressing a shutter release button (not shown), the rotary shutter coupled to the driving motor 15 starts rotating. When the switch SW14a is closed, the recording circuit connected to the image sensor 5 is completed and records image information generated by the image sensor 5. When the dial 11 is turned counterclockwise from the selected shutter speed indicia 1/125, the end 12a of the lever 12 is moved to the left (FIG. 5) to open the switches 13, 14a. The control circuit then opens the power supply circuit for the driving motor 15, whereupon the rotary shutter stops its rotation. The recording circuit is disabled by the control circuit. If the dial 11 is continuously turned counterclockwise until the indicia STAY is selected, then a switch 14b is closed to complete the recording circuit while the power supply circuit for the driving motor 15 remains open. At this time, the shutter speed depends only on the scanning speed of the image sensor 5 (not shown in FIG. 5) disposed behind the shutter blade 5 and the adjusting blade 2. Since the time required for scanning the image sensor 5 for one field is 1/60 second, as described above, the shutter speed is 1/60 second when the dial 11 is set to the STAY position.

The shutter speed of the rotary shutter is generally determined by the magnitude of an opening angle N. The smaller the opening angle N, the higher the shutter speed. According to the illustrated embodiment, the opening angle N of the rotary shutter is varied as the dial 11 is turned. When the dial 11 is turned clockwise, a pin 16 mounted on the dial 11 is also turned clockwise. Inasmuch as the end of the pin 16 is inserted in a cam shot composed of cam slot portions 17a, 17b in a lever 17, the lever 17 is also turned clockwise. The cam slot portion 17a serves to keep the indications on the dial 11 at equal intervals, and may be an elongate straight slot. As the lever 17 is turned clockwise, a pin 18 mounted on the lever 17 is also turned clockwise. Since the end of the pin 18 is fitted in a groove defined in a slider 19, the slider 19 is moved to the right (FIG. 5). On the slider 19, there is mounted a pin 20 having its end fitted in a cam slot 20b defined in a shutter blade shaft 20a and a cam slot 20d defined in an adjusting blade shaft 20c. The adjusting blade 2 is therefore turned counterclockwise to reduce the opening angle N.

Conversely, when the dial 11 is turned counterclockwise from the indicia 1/250 until the position STAY is selected, the end of the pin 16 is moved from the cam slot portion 17a into the cam slot portion 17b to keep the openings 4A through 4F open to the greatest degree. At this time, the lever 12 is moved to the left (FIG. 5). Because the end of a pin 21 on the lever 12 is fitted in a groove defined in a slider 22, the slider 22 is slid to the left to bring projections 23 of the slider 22 into fitting engagement with recesses 25 defined in a main shaft 24. The slider 22 is movable axially with respect to the main shaft 24, but is now prevented from rotating with respect thereto by engagement with the pin 21. One of the openings 4A through 4R is now positioned in alignment with the image sensor 5. In order to avoid shading of the image sensor 5, it is preferable to keep the opening angle N of the openings 4A through 4F as large as possible while the rotary shutter is held at rest.

The control circuit for opening and closing the power supply circuit for the driving motor 15 may be composed of lead wires connected to the switches 14a, 14b and external switches, but may be composed of a microcomputer, as described below.

Figures 6, 7:
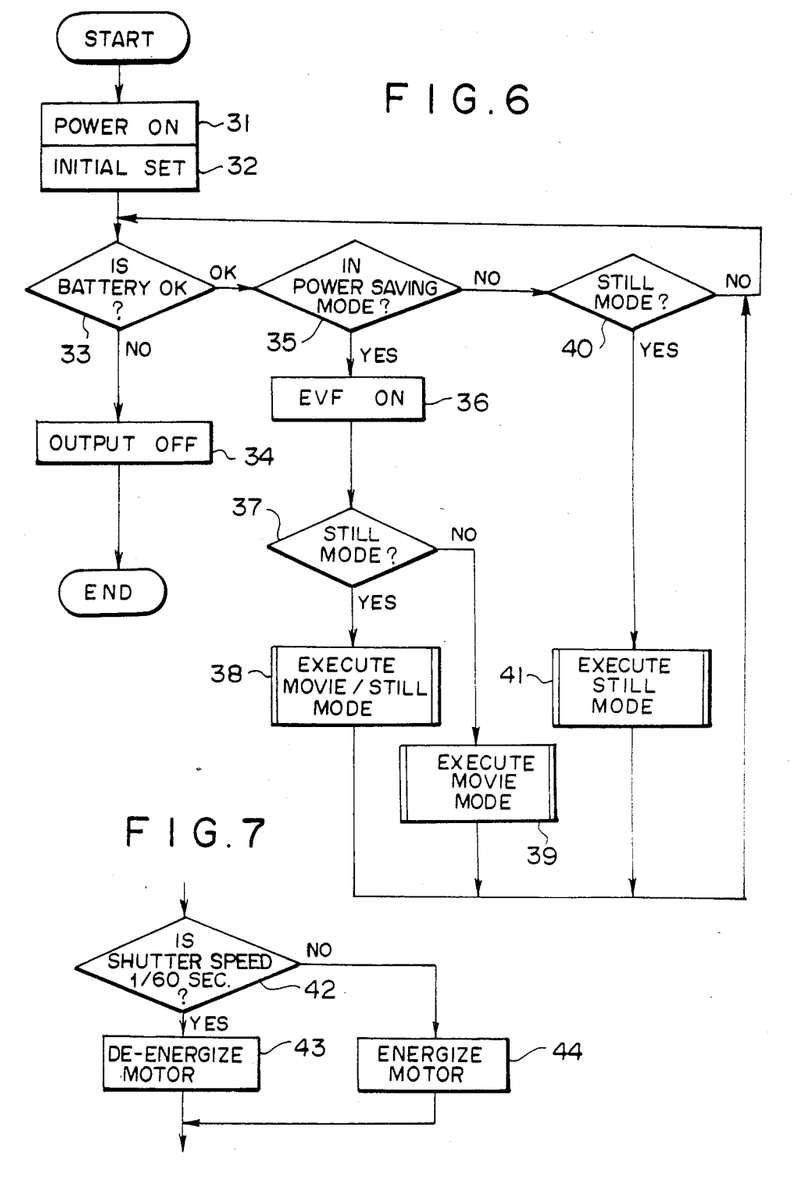
FIG. 6 is a flowchart of a main-routine program for operating a camera with the rotary shutter device.
FIG. 7 is a flowchart of a subroutine program in the main routine illustrated in FIG. 6.

The electronic still camera or VTR camera in which the rotary shutter device of the invention is incorporated has various modes such as a movie mode for photographing successive images, a still mode for photographing still images, and a movie/still mode for photographing successive and still images at the same time. The modes of operation of the camera are selected and changed accurately and quickly under the control of a microcomputer (not shown). FIG. 6 shows a flowchart of the main routine of the programmed operation of the microcomputer. The main routine includes subroutines for the respective modes. When an input switch SW is closed, the program is executed to switch on the power supply in a step 31 and then initialize the settings in a step 32. The battery is checked at a step 33. If the battery is low, then it is turned off in a step 34 and the program is brought to an end. If the battery is sufficiently charged, then control checks whether the camera is in a power saving mode for saving electric power in a step 35. If not, then the power supply for an electronic viewfinder for monitoring photographed images is turned on in a step 36. Thereafter, control ascertains whether the still mode is selected or not in a step 37. If selected, then the movie/still mode is executed in a step 38. If not selected, then the movie mode is executed in a step 39. If the camera is in the power saving mode in the step 35, then the program goes to a step 40 which detects if the still mode is selected or not. If selected, then the still mode is executed in a step 41. If not, then the program goes back to the step 33 for battery checking. After the respective modes have been completed, the program returns to the step 33 for battery checking. Each of the mode steps 38, 39, 41 is composed of a subroutine as illustrated in FIG. 7. The subroutine of FIG. 7 includes a step 42 for ascertaining whether the shutter speed as set is 1/60 second or less than 1/125 second based on supplied information on the angular displacement of the dial 11. If the shutter speed setting is 1/60 second or less than 1/125 second, then the power supply circuit for the driving motor 15 is opened to stop the motor 15 in a step 43. If another shutter speed is selected, then the driving motor 15 is energized in a step 44.

A rotary shutter device according to a second embodiment will be described with reference to FIGS. 8 and 9. In the foregoing embodiment, the image information stored in the MOS image sensor 5 is read by the sequential scanning system. According to the second embodiment, however, the image information stored in a MOS image sensor 5a is read by the interlaced scanning system. In the interlaced scanning system, it is necessary to shield the image sensor 5a from the light until the scanning of the image sensor 5a for the second field is finished. The shutter blade 1a and the adjusting blade 2a jointly have shielding portions larger than those of the first embodiment. The image sensor 5a is exposed to light for one field over 1/30 second which is twice the exposure period of the first embodiment. The operation of the adjusting blade 2a with respect to the shutter blade 1a is the same as described above with reference to the first embodiment.

Figure 9:
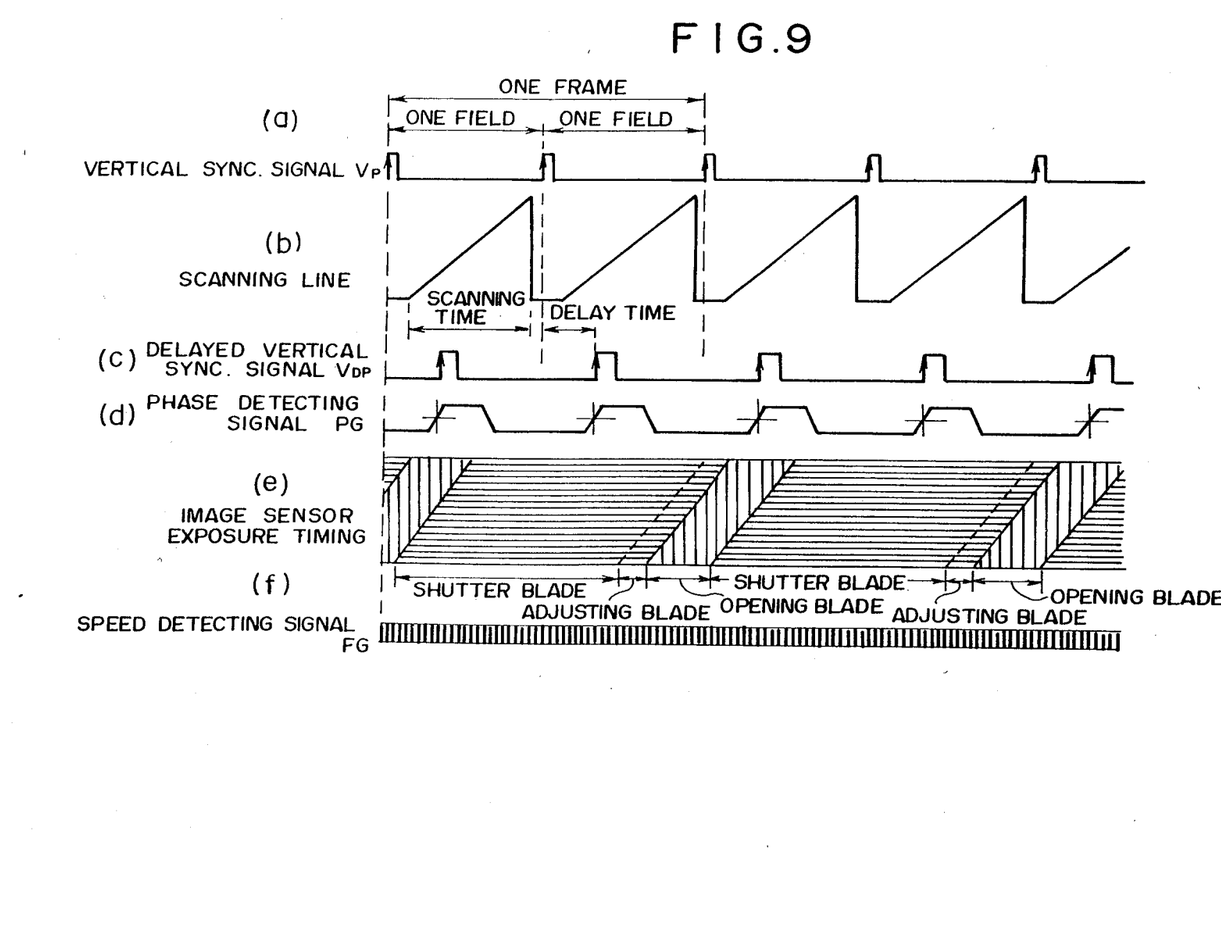
FIG. 9 is a timing chart of the operation of the rotary shutter device of FIG. 8 and of various signals produced for the operation thereof.

FIG. 9 is a timing chart of the operation of the rotary shutter device according to the second embodiment. Comparison of FIGS. 4 and 9 shows that although (a) the vertical synchronizing signal $V_P$, (b) the scanning lines, (c) the delayed vertical synchronizing signal $V_{DP}$, (d) the phase detecting signal PG, and (f) the speed detecting signal FG in FIG. 9 are substantially the same as those in FIG. 4, (e) the timing for exposing the image sensor 5a is different from that of FIG. 4. FIG. 9(e) indicates that the shielding period is longer than the exposure period.

Figure 8:
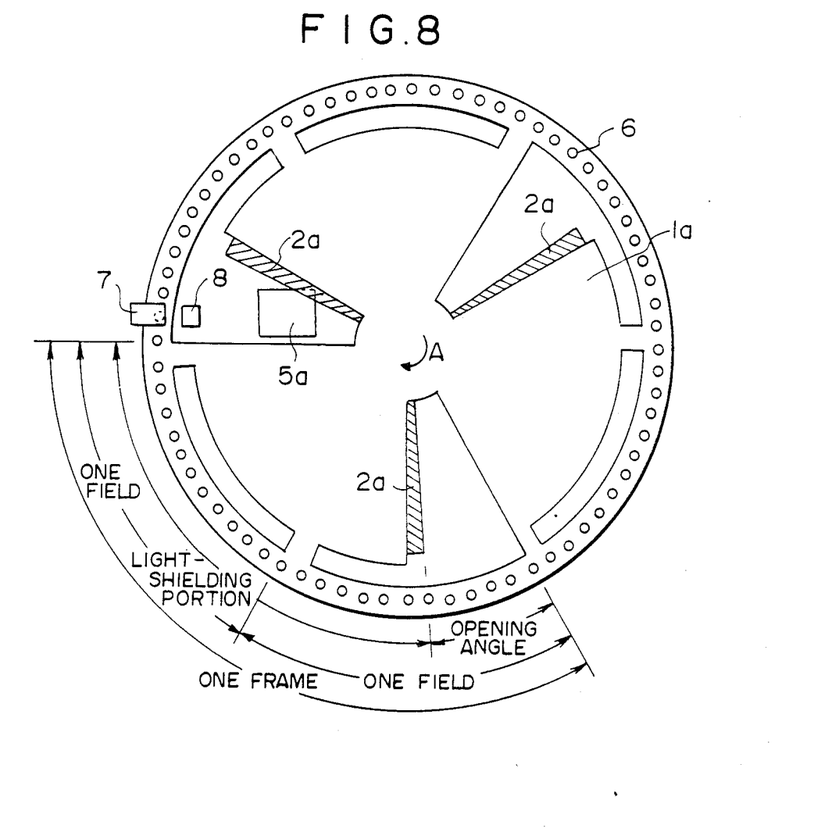
FIG. 8 is a plan view of a rotary shutter device according to a second embodiment of the present invention.

Although the shutter blades shown in FIGS. 1 and 8 have six and three openings, respectively, the number of the openings is not limited to these numbers, but more or less openings may be provided in the shutter blade insofar as they allow the image sensor to be scanned in the aforesaid manner for reading the stored image information. In addition, shutter blades of other shapes than the illustrated configuration may be employed. The FG and PG sensors 7, 8 are employed in the embodiments of FIGS. 1 and 8 for the control of the speed and phase of rotation of the shutter blade. However, only the speed control or the phase control may be used providing the rotation of the shutter blade and the horizontal scanning of the image sensor can be synchronized with each other. The dial 11 for selecting shutter speeds may be replaced with a slide lever for selecting shutter speeds. The image sensor 5 may comprise a CCD image sensor.

Although certain preferred embodiments have been shown and described, it should be understood that many changes and modifications may be made therein without departing from the scope of the appended claims.

We claim:
1. A rotary shutter device comprising:
 (i) a solid-stage imaging device for converting an optical image focused on a photodetector surface thereof and read by successive horizontal scanning into a video signal;
 (ii) a first shutter member in front of said solid-state imaging device and rotatable about its own axis, said first shutter member including a first shutter blade having at least one opening for transmitting light therethrough onto said photodetector surface;
 (iii) a second shutter member disposed adjacent to said first shutter member and having a second shutter blade for varying the opening angle of said opening; and
 (iv) means for rotating said first and second shutter members together to rotate said opening in a direction to successively expose said solid-state imaging device to the light in the direction in which said solid-state imaging device is vertically scanned, said solid-state imaging device being completely scannable between two successive exposures thereof through said opening.

2. A rotary shutter device according to claim 1, wherein said solid-state imaging device comprises a MOS image sensor.

3. A rotary shutter device according to claim 2, wherein said means comprises means for rotating said first and second shutter members so that the MOS image sensor starts to be shielded from the light by an edge of said opening in synchronism with the starting of horizontal scanning of said MOS image sensor where it is shielded from the light.

4. A rotary shutter device according to claim 1, further including shutter speed selecting means for selecting an opening angle for said opening, adjusting means for adjusting said opening angle of the opening in response to operation of said shutter speed selecting means, control means for opening a driving circuit for said rotating means when said shutter speed selecting means is operated from a reference position beyond a predetermined interval, and means for increasing said opening angle of the opening to an extent greater than the size of said solid-state imaging device and bringing said opening into alignment with said solid-state imaging device.

* * * * *